(12) United States Patent
Van Rens et al.

(10) Patent No.: US 8,731,271 B2
(45) Date of Patent: May 20, 2014

(54) GENERATING OBJECT DATA

(75) Inventors: Bram Antonius Philomena Van Rens, Eindhoven (NL); Raoul Florent, Ville d'Avray (FR)

(73) Assignee: Koninklijke Philips N.V., Eindhoven (NL)

( * ) Notice: Subject to any disclaimer, the term of this patent is extended or adjusted under 35 U.S.C. 154(b) by 144 days.

(21) Appl. No.: 13/384,640

(22) PCT Filed: Jul. 28, 2010

(86) PCT No.: PCT/IB2010/053429
§ 371 (c)(1),
(2), (4) Date: Jan. 18, 2012

(87) PCT Pub. No.: WO2011/018727
PCT Pub. Date: Feb. 17, 2011

(65) Prior Publication Data
US 2012/0148135 A1  Jun. 14, 2012

(30) Foreign Application Priority Data
Aug. 12, 2009  (EP) ..................................... 09305750

(51) Int. Cl.
*G06K 9/00*  (2006.01)
(52) U.S. Cl.
USPC .......................................................... 382/131
(58) Field of Classification Search
USPC .......................... 382/128–134; 128/920–925;
356/39–49; 600/407–414, 424–426;
345/581–618; 250/455–457
See application file for complete search history.

(56) References Cited

U.S. PATENT DOCUMENTS

| 6,643,533 B2 | 11/2003 | Knoplioch et al. |
| 2004/0066958 A1 | 4/2004 | Chen et al. |
| 2006/0084862 A1 | 4/2006 | Suurmond et al. |

FOREIGN PATENT DOCUMENTS

EP   08102356.6   *   3/2009   ................ G06T 7/00

OTHER PUBLICATIONS

Jens N. Kaftan et al, "Fuzzy Pulmonary Vessel Segmentation in Contrast Enhanced CT Data", Proc. of SPIE, vol. 6914, pp. 64191Q-1-64191Q-12.
N. Flasque et al, "Tubular Objects Network Detection from 3D Images", Image Analysis and Interpretation, 2000. 4th IEEE Southwest Symposium, Apr. 2-4, 2000 pp. 96-100.

* cited by examiner

*Primary Examiner* — Atiba O Fitzpatrick (57) ABSTRACT

Improving the generation or a 3D vessel model of a region ot interest of an object includes: acquiring image data of the region of interest comprising picture elements and embodying multiple predetermined features; deriving, for ones of the picture elements, respective probability values; displaying, for interaction purposes, ones from among the probability values such that a plurality from among the features are in the displayed values; designating a feature; deciding, based on the designation, what constitutes, from among the multiple predetermined features, the closest relevant predetermined feature; and calculating, to thereby generate, object data on behalf of what was decided to be the closest relevant predetermined feature.

21 Claims, 7 Drawing Sheets

GENERATING OBJECT DATA

FIELD OF THE INVENTION

The invention relates to the generation of object data of features of a region of interest of an object. In particular, the invention relates to the generation of a 3D vessel model of a region of interest of an object. The invention relates particularly to a medical imaging system and a method for generating object data of features, such as a 3D vessel model of a region of interest of an object. The invention also relates to a computer program element as well as a computer readable medium for generating object data such as a 3D vessel model of a region of interest of an object.

BACKGROUND OF THE INVENTION

For example, two-dimensional (2D) X-ray projection images of contrast enhanced vascular structures are commonly used by interventionalists to support the treatment of patients with heart disease, for example. The 2D projection images, which are also referred to as angiograms, are often used to appreciate quantities like vessel length, diameter and shape, for example. However, a true three-dimensional (3D) anatomy of the imaged vessels is lost in the angiograms which may lead to misinterpretation of the considered vessel quantities, for example. Therefore, it is known to generate a 3D representation of the vessels of interest, for example, in coronary interventions. Therefore, the vessels of interest are manually segmented in at least two angiograms which have been acquired at different viewing angles. The 3D vessel model can then be constructed from the at least two 2D segmentations using epipolar geometry. For example, US 2006/0084862 A1 describes a method including acquiring a model of a vascular system based on image data generated by an imaging device, identifying a portion of interest of the vascular system and determining a vessel axis for a vessel of interest for the reconstruction of a 3D arterial tree. However, in order to create reliable and truthful 3D vessel models, 2D segmentations from which the 3D vessel model is constructed should be as accurate as possible. This especially holds for the 2D vessel centrelines, which form the basis for the skeleton of the 3D model. Since the clinical user indicates the position of the 2D centrelines by clicking points, for example on the angiogram, which points are then used to extract an accurate shape and position of the 2D centreline from the angiogram, the possible accuracy relies on the exactness of the input by the clinical user. It has been shown that, in order to improve the accuracy of the 3D vessel model, the user has to make sure that the input is as accurate as possible which means that the interaction step is unnecessarily time consuming, what may lead to fatigue and loss of concentration which thus should be avoided.

SUMMARY OF THE INVENTION

Hence, there may be a need to facilitate and improve the generation of a 3D vessel model of a region of interest of an object.

According to an exemplary embodiment of the invention, a method for generating object data of features of a region of interest of an object is provided comprising the following steps: acquiring image data of a region of interest of an object; determining probability values for predetermined features in the image data for each picture element; displaying the probability values for each picture element of the image data for interaction purposes; designating features in the displayed probability values by interaction of the user; determining closest relevant predetermined features on behalf of the designated features; calculating object data on behalf of the determined features; and using the calculated object data for further processes.

The image data can be acquired, for example, by an X-ray imaging device, such as a CT or CT-Scanner, or by MRI or ultrasound or by any other suitable image acquisition device directly or indirectly providing 2D image data, for example.

According to an exemplary embodiment of the invention, the features are vessels and wherein the 3D model is a vessel model, wherein the acquiring step comprises acquiring at least two 2D X-ray projection images of contrast enhanced vascular structures from different viewing angles; the determining step comprises determining a probability map for predetermined vessel features for each of the 2D X-ray projection images; the displaying step comprises displaying the probability map for each of the 2D X-ray projection images for interaction purposes; the identification step comprises segmenting vessels of interest by: indicating a location of a first set of points of interest in the probability map of one of the at least two 2D X-ray projection images by interaction of the user; determining and displaying epipolar lines for the first set of points of interest in the probability map of the other one of the at least two 2D X-ray projection images; indicating a location of a second set of points of interest in the probability map of the other one of the at least two 2D X-ray projection images by the user, wherein the epipolar lines act as orientation and wherein the second set of points is corresponding to the indicated first points; determining the closest relevant predetermined features of the vascular structure upon the indication of the location of points of interest; extracting coordinates for the determined relevant predetermined features of the vascular structure; and wherein the calculating step comprises calculating a 3D vessel model from the extracted coordinates for the determined relevant predetermined features.

According to an exemplary embodiment of the invention, the extracted coordinates of the relevant predetermined features may represent 2D centrelines, bifurcation points and/or vessel borders.

According to an exemplary embodiment of the invention, the coordinates may also relate to other features such as high-curvature points, for example, which may be located on the borders or on the centerlines. High-curvature points may be defined as the points where the curvature of the underlying line, for example a centerline, a border or an isophote line, shows a local maximum. High-curvature points can, for example, be located at the branching site of two vessels, but also on very strong bendings along a given vessel branch.

According to an exemplary embodiment of the invention, the coordinates may also relate to special radiometry points such as calcification peaks within the vessels.

In any case, the coordinates relate to feature points that may be identified with a low level of ambiguity in the image data used for a modelling process, for example, and that are of particular interest and thus want to be included in a model, for example.

According to an exemplary embodiment of the invention, bifurcation points can be defined as intersection points of centerlines.

It must be noted that according to an exemplary embodiment of the invention, the steps of d) designating features in the displayed probability values by interaction of the user, e) determining closest relevant predetermined features on behalf of the designated features and f) calculating object data on behalf of the determined features can be defined as representing a segmenting step wherein the steps d), e) and f) are then sub-steps.

According to the invention, the probability map gives an indication to the user which pixels or image points in the angiogram have a high probability of lying on or close to the predetermined features, for example a vessel centreline. This information is derived from the pixel for image points grey values in the original angiogram. The probability map can also indicate which pixels in the angiogram have a high probability of lying on or close to, for example, a bifurcation in the angiogram. The probability map is thus showing information concerning the predetermined features, for example vessel centrelines, for which also the term centerness energy map can be used. The part of the information relating to bifurcations can thus be described as bifurcation energy map. By combining the two types of information in the probability map, the user can be provided with very helpful information in form of an enhanced image where an impression of the actual vessel tree is much easier to derive from.

Displaying the probability map for interaction purposes supports the clinical user in placing the indication points for the predetermined features such as centrelines, bifurcation points and/or vessel borders at a more accurate position in the angiogram than it is possible by simply showing an angiogram. In other words, the user indicates points on the probability map which are much closer to, for example, the actual vessel centreline or bifurcation point because the probability map is already presenting enhanced image information. Thus, misinterpretation of image information in an angiogram by the user and the indication of wrong locations of points of interest can be avoided.

According to an exemplary embodiment of the invention, the indication of a location of a set of points is done manually by the user.

This provides the advantage that the user can evaluate the shown probability map and to choose the vessels of interest according to the particular needs for the present interventional procedure.

According to an exemplary embodiment of the invention, the indication of a location of a set of points may also be performed by the processing unit.

This allows facilitating the steps necessary by the user, for example, by an image analysis procedure performed automatically. Of course, it is also possible to make a proposal of an indication of the location of the set of points based on image analyses which proposal can then be confirmed, or rejected, by the user.

According to an exemplary embodiment of the invention, the epipolar lines are lines on which the corresponding indicated points should be positioned. The epipolar lines are determined by using epipolar geometry.

According to an exemplary embodiment of the invention, the extracted centrelines are displayed for an assessment of accuracy of the centrelines by the user before the step of calculating the 3D vessel model is performed.

This provides the advantage that the user can visually control whether the extracted 2D centrelines are according to his intention. In other words, the display of the extracted 2D centrelines provides for an improvement of the quality of the calculation of the 3D vessel model.

According to an exemplary embodiment, upon assessment by the user, the steps for the segmentation of the vessels of interest are repeated.

To repeat the steps for the segmentation allows for an adaption and thus improvement of the extracted 2D centrelines acting as a base for the calculation for the 3D vessel model. The repetition can be multi-fold according to the user's requirements.

According to an exemplary embodiment, the indication of the points of interest is achieved by clicking on the image with a user device.

Thus, the user can easily identify the points of interest and enter the commands to choose exactly these identified points for further processing.

The cursor device can be for example a mouse, a scroll ball, a graphical pen or tablet or the like. For example, the cursor device can be chosen according to other equipment already available in the surrounding for a particular intervention.

For example, in case a graphical tablet is already provided due to other needs because of certain requirements for certain interventional steps, the graphical tablet can be used for the interaction of the user for generating the 3D vessel model.

According to another exemplary embodiment, the probability map is displayed in combination with the 2D X-ray projection images.

This provides the advantage that the probability map also shows at least in those areas where the probability map is indicating a lower probability map or no probability, a type of graphical information that the user is used to work with. By combining the probability map with 2D X-ray projection images, the acceptance can be enhanced because the user feels comfortable with the sort of image he sees, for example.

According to an exemplary embodiment if the invention, the 2D X-ray projection images are angiograms.

By combining or blending angiograms with a probability map according to the invention, an image is generated with enhanced graphical information facilitating the understanding of the features shown. The resulting images can be referred to as augmented angiograms.

According to an exemplary embodiment of the invention, the probability map displayed in combination with the 2D X-ray projection images, for example blended over an angiogram, can be adapted such that the user can determine thresholds for the probability of the probability map.

In other words, the user can control the intensity of the probability map overlaid onto the angiogram. This allows the user to be provided with the information about the probability of features such as a centreline or bifurcation point, for example, as well as being provided with the information shown in the angiogram. This provides the possibility to keep possible disorientation as low as possible related to users using the new form of probability map for the first time and users who are not so familiar with this new type of information.

According to an exemplary embodiment of the invention, a series of 2D X-ray projection images is acquired for each viewing angle, which images are registered to a time rating. The images of the different viewing angles corresponding to the same phase are chosen as the acquired at least two 2D X-ray projection images.

This provides a further improvement due to choosing images with an optimum content of graphical information that is suitable for the further processing steps.

According to an exemplary embodiment of the invention, choosing the images is performed by the user manually selecting the images representing the acquired at least two 2D X-ray projection images.

According to an exemplary embodiment of the invention, the choice or selection of images from a series of 2D X-ray projection images is performed automatically based upon predetermined image information parameters.

According to an exemplary embodiment of the invention, the time rating is based upon the measurement of a physiological parameter.

This provides the advantage that the X-ray images, for example relating to a coronary artery, belong to the same cardiac phase or to same respiration motion, for example.

For example, the physiological parameter is an ECG signal.

According to an exemplary embodiment of the invention, the physiological parameter, for example the ECG signal, is displayed in combination with the probability map.

This provides the user with additional information that can be used, for example, for quality control or for choosing images of the same cardiac phase, for example.

According to an exemplary embodiment of the invention, the angle between the two different viewing angles is at least 30 degrees.

According to an exemplary embodiment of the invention, the viewing angle is 90 degrees.

According to an exemplary embodiment of the invention, upon indicating one of the points of interest, a position of the closest relevant feature is detected and the indicated points are snapped to the detected position.

This provides the advantage that the user can indicate the points of interest in a rather inaccurate way wherein the snapping function provided assures that necessary accuracy for a precise 3D model.

For example, in case the user indicates the points of interest with a cursor, such as a mouse, the user has to place a cursor only in the vicinity or surrounding of the points he actually intends to identify as an indication, which means the user has to spend less time and less concentration for the interaction steps. This means a relief on the work load and on the consumption of time necessary for the generation of 3D vessel model. In other words, the user can save time and energy that can be used for the actual interventional step.

According to an exemplary embodiment of the invention, the detected position is indicated as a guiding option to the user.

By providing a guiding option to the user, for example by indicating the position the cursor or the identification mark could snap to, a quality control loop for improvement is introduced, because the user can decide whether to choose the proposed point, in other words to snap to this point, or to actually use the position of the cursor for the interaction step.

Simply said, the user can be provided with different modes which, for example, can be chosen according to individual requirements.

According to an exemplary embodiment of the invention, the setting of the mode is performed automatically in relation to the type of intervention for which the generation of 3D vessel model is used for.

For example, in one mode, the snap-to function can be turned off, that is the snapping is completely decoupled from the clicking or indication process based on the probability map.

In another mode, snapping is turned on, and clicked or indicated points are snapped to the calculated positions.

In a further mode, both modes described above are mixed, so to speak. In other words, the user can indicate the points of interest on the probability map and at the same time the suggestion of positions where the snapping functionality could be applied to, is also shown. In this mode, the user has the possibility to decide which point or location he actually wants to use, for example the position where he initially clicked on, or the proposed point to be snapped to, or a position somewhere in between.

According to another exemplary embodiment of the invention, the step of determining the probability map is based on previous interaction by the user.

For example, the probability map can be evolved based on previous clicks, for instance incorporating epipolar information. By introducing this so to speak self-learning process, it is possible to provide enhanced probability maps that consider the input and thus the experience and knowledge of the user interacting with the determined or calculated data.

In an exemplary embodiment of the invention, a spline is computed based on indicated points and the spline is used for calculating the probability map.

For example, the probability belonging to the vessel can thus be derived from a determined probability map and based on already clicked points on the same vessel, as an example. By this combination, it is possible to incorporate information in the probability map that results from previous clicks. In this way, certain regions of the probability map can be enhanced, for example or even completely excluded for next steps. This further improves the data used for extracting of 2D centrelines and as well for the calculation of a 3D vessel model.

According to a further exemplary embodiment of the invention, the probability map is adapted to the position of the cursor device such that the probability map is shown in an enhanced mode in the vicinity of the curser and in a reduced level of detail in other parts.

This provides the advantage that a probability map is showing basic information only in a general overview whereas by moving the cursor device to a location of interest, in other words to a location where the user wants to identify and thus indicate a point of interest, the probability map is shown in a mode with more information.

In another exemplary embodiment of the invention, the probability map is shown in combination with an angiogram.

In case the user moves the cursor to a desired area, the vicinity of the cursor is shown in greater detail thus covering more of the angiogram whereas the basic information shown in the rest of the image is only covering a minimum amount of surface of the angiogram. This provides the user with an angiogram he is used to so far, according to his experience, whereas the basic information of the so to speak reduced probability map is giving some general orientation. For interaction purposes, the probability map is shown in an enhanced mode surrounding the position of interest to allow a precise identification of the points of interest.

According to an exemplary embodiment of the invention, a medical imaging system for generating object data of features of a region of interest of an object is provided comprising at least one image data acquisition device, a data processing unit, a display device and an interface unit. The image data acquisition device is arranged to acquire image data of a region of interest of an object. The data processing unit is adapted to determine probability values for predetermined features in the image data for each picture element, to determine closest relevant predetermined features on behalf of the designated features, to calculate object data on behalf of the determined features and to use the calculated object data for further processes. The display device is arranged to display the probability values for each picture element of the image data for interaction purposes. The interface unit is adapted for the designation of features in the displayed probability values by interaction of the user.

The image data can be acquired, for example, by an X-ray imaging device, for example a CT or CT-Scanner, by an MRI or by using ultrasound or any other suitable image acquisition device directly or indirectly providing 2D image data, for example.

According to an exemplary embodiment of the medical imaging system, the features are vessels and the generated object data is a 3D vessel model. The image data acquisition device is an X-ray image acquisition device arranged to acquire at least two 2D X-ray projection images of contrast enhanced vascular structures from different viewing angles. The data processing unit is adapted to determine a probability map as probability values for predetermined vessel features for each of the 2D X-ray projection images, to determine epipolar lines for a first set of points of interest in the probability map of the other one of the at least two 2D X-ray projection images, to determine the closest relevant predetermined features of the vascular structure upon an indication of the location of points of interest, to extract coordinates for the determined relevant predetermined features of the vascular structure and to calculate a 3D vessel model from the extracted coordinates for the determined relevant predetermined features. The display device is arranged to display the probability map for each of the 2D X-ray projection images for interaction purposes, and to display the epipolar lines for the first set of points of interest in the probability map of the other one of the at least two 2D X-ray projection images, wherein the epipolar lines act as orientation. The interface unit is adapted for an indication of a location of a first set of points of interest in the probability map of one of the at least two 2D X-ray projection images by the user and for an indication of a location of a second set of points of interest in the probability map of the other one of the at least two 2D X-ray projection images by the user, wherein the second set of points is corresponding to the indicated first points.

According to an exemplary embodiment of the invention, the data processing unit is adapted to detect a position of the closest relevant feature of the probability map upon indicating one of the points of interest and to snap the indicated points to detected position.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

BRIEF DESCRIPTION OF THE DRAWINGS

The aspect defined above and further aspects, features and advantages of the present invention can also be derived from the examples of embodiments to be described herein after and are explained with reference to examples of embodiments, but to which the invention is not limited. The invention will be described in more detail hereinafter with reference to the drawings.

DETAILED DESCRIPTION OF THE INVENTION

Figure 1:
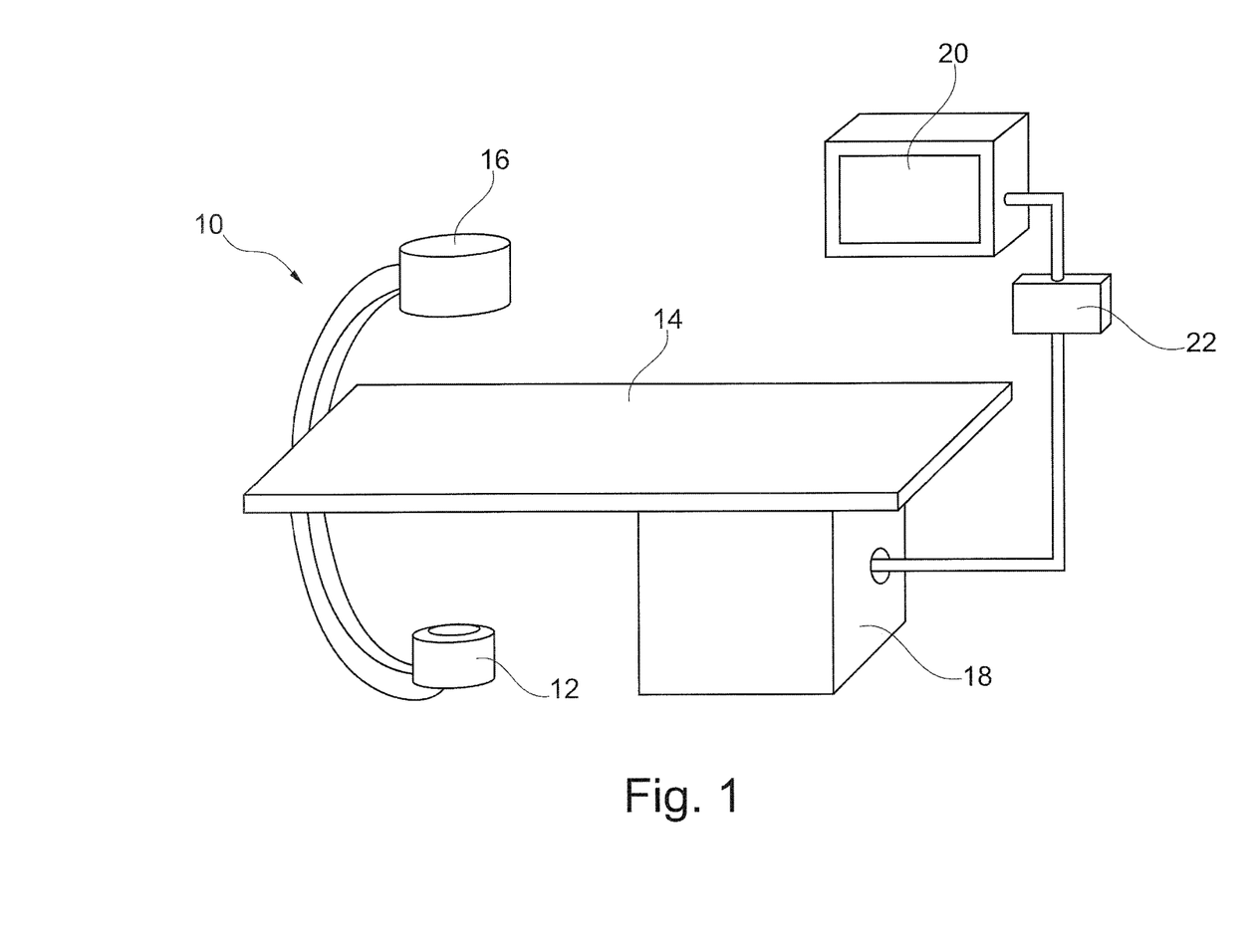
FIG. 1 schematically shows an X-ray imaging system according to the invention.

FIG. 1 schematically shows as an example for an image acquisition device an X-ray imaging system 10 with an examination apparatus. The examination apparatus comprises an X-ray image acquisition device with a source of X-ray radiation 12 provided to generate X-ray radiation. A table 14 is provided to receive a subject to be examined. Further, an X-ray image detection module 16 is located opposite the source of X-ray radiation 12, i.e. during the radiation procedure, the subject is located between the source of X-ray radiation 12 and the detection module 16. The latter is sending data to a data processing unit or calculation 18, which is connected to both the detection module 16 and the radiation source 12. The data processing unit 18 is located underneath the table 14 to save space within the examination room, for example. Of course, it could also be located at a different place, such as a different room. Furthermore a display device 20 is arranged in the vicinity of the table 14 to display information to the person operating the X-ray imaging system, i.e. a clinician, such as a cardiologist or cardiac surgeon. Preferably, the display device 20 is movably mounted to allow for an individual adjustment depending on the examination situation. Also, an interface unit 22 is arranged to input information by the user. Basically, the image detection module 16 generates images by exposing the subject to X-ray radiation, wherein said images are further processed in the data processing unit 18. It is noted that the example shown is of a so-called C-type X-ray image acquisition device. Of course, the invention also relates to other types of X-ray image acquisition devices. The procedure according to the invention is described in more detail below.

The X-ray imaging system 10 is provided for generating a 3D vessel model of a region of interest of an object, such as a patient. Therefore, the X-ray image acquisition device comprising the source of X-ray radiation 12 and the image detection module 16, is arranged to acquire at least two 2D X-ray projection images of contrast enhanced vascular structures from different viewing angles. For example, the C-type X-ray image acquisition device shown in FIG. 1 is capable of rotating around a patient lying on the table 14 to acquire the at least two 2D X-ray projection images. Based on the data from the 2D X-ray projection images, a probability map for predetermined vessel features is determined. Of course, a probability map is determined for each of the 2D X-ray projection images. The determined probability maps are then displayed on the display 20 for each of the 2D X-ray projection images for interaction purposes by the user.

Figure 2:
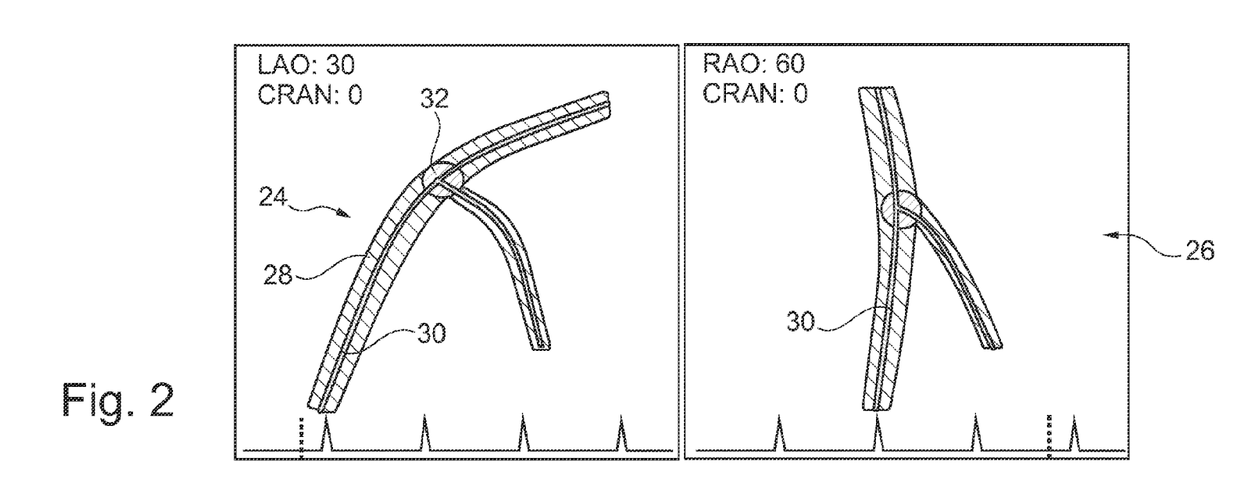
FIG. 2 schematically shows a probability map for interaction purposes.

As an example, FIG. 2 shows a probability map 24 for one viewing angle in the left part of the image and a probability map 26 for the same region of interest but with a different viewing angle. For example, the difference in the viewing angle between the left part and the right part of the display schematically shown in FIG. 2 is about 90 degrees. The probability maps 24, 26 give an indication to the user which pixels in the angiogram, in other words the acquired X-ray images, have a higher or lower probability of lying on or close to a vessel centreline. Similarly, the probability map also indicates the position of bifurcations in the angiogram acting as a base for the probability map. In other words, the probability map shows centerness energy information and bifurcation energy information. The probability maps 24, 26 thus provide enhanced information, so to speak filtered and interpreted information from the X-ray image, that is of more use to the user, because by providing probability information the possibility for misinterpretations or the need for intensive study of an X-ray image can intensively be reduced.

Of course, the probability may also represent other features of interest such as high-curvature points, for example, which may be located on the borders or on the centerlines. High-curvature points may be defined as the points where the curvature of the underlying line, for example a centerline, a border or an isophote line, shows a local maximum. High-curvature points can, for example, be located at the branching site of two vessels, but also on very strong bendings along a given vessel branch. The coordinates may also relate to special radiometry points such as calcification peaks within the vessels.

By the probability map 24 in the left part of the image shown in FIG. 2, the user is provided with the information that the probability for a centreline actually being located in the indicated area is of a certain predetermined degree of probability. For example, a first patterned area 28 indicates a lower probability for a centreline lying in this particular area of the image whereas another graphical representation, in this case a thicker dotted line 30 indicates that there is a high probability of a centreline of the vessel identified in the angiogram is lying in this particular indicated area. Another graphical parameter is chosen for indicating the location of a bifurcation, which in FIG. 2 is indicated by a second patterned area 32.

Similar information about the probability of a centreline lying in a certain area of the image is provided in the right part of image in FIG. 2 by providing the other probability map 26.

Of course, the provision of information about the degree of probability can be achieved by different coding, such as colours as well.

The user then clicks points on the centrelines of the vessels to be segmented in the first probability map 24 by using the probability map for interaction purposes. Hence, the user does not click on an angiogram but he clicks on enhanced graphical data in form of the probability map 24. For example, the user identifies the location of the bifurcation indicated with the second pattern 32 in FIG. 2, which identification is done by indicating the location with, for example, a cursor's click and thereby generating a dot 34 in the left part of FIG. 3. Next, the user identifies the end of the vessel of interest and places another dot 36, for example, by moving a cursor 38 to the desired location and clicking with the interface device.

Figure 3:
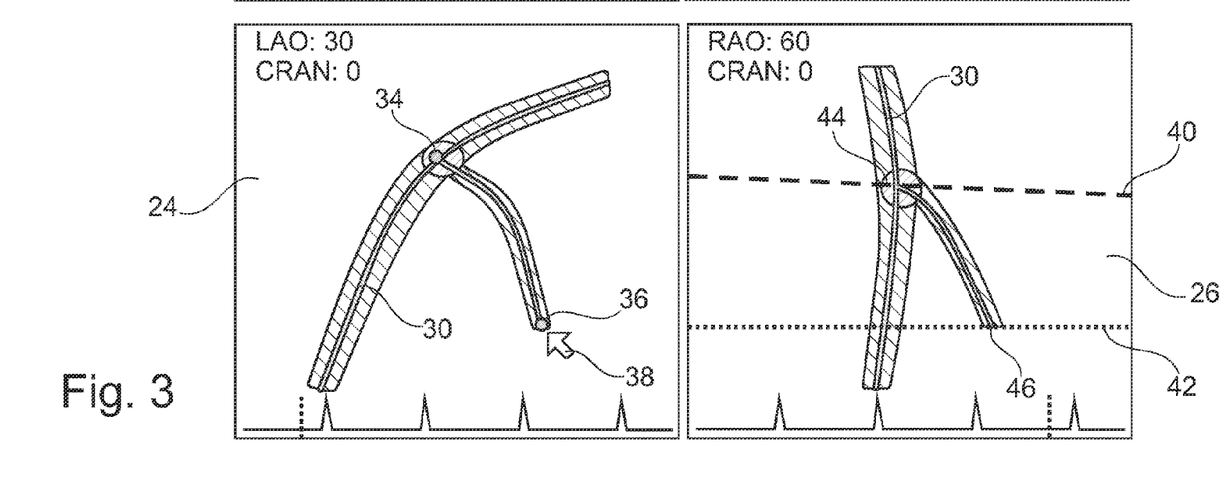
FIG. 3 schematically shows a probability map with indicated points (left part) and epipolar lines (right part) for interaction purposes.

In other words, the user indicates the location of a first set of points, namely for example points 34 and 36, of interest in the probability map 24 of one of the at least two 2D X-ray projection images by interaction, i.e. by moving and clicking the cursor device 38.

Based on these points belonging to the first set of points, epipolar lines are determined for the set of points and are then displayed in the probability map of the other one of the at least two 2D X-ray projection images which in FIG. 3 is the probability map 26 in the right half of the image shown. At first, an epipolar line 40 is indicated in a first pattern indicating the location of the first point 34 representing the bifurcation point in the probability map 24 in the left half of the image. A second epipolar line 42 is shown in a second pattern indicating the location or the possible location of the second point 36 in the probability map 24. The patterns of the epipolar lines can be adapted to match to the patterns used for the indicated points.

Then the user indicates location of a second set of point of interest in the probability map 26 of the other one of the at least two 2D X-ray projection images. This is done by using the epipolar lines 40, 42 as an orientation. For example, the user clicks on the intersection of the first epipolar line 40 with the graphical information about a highest probability for the location of a centreline presented by the dotted line 30. In other words, the user generates a further mark or dot 44. For indicating the location of the end of the vessel, represented by the dot 36 in the left part, the user generates a second dot or mark 46 in the right part of the image, for which the user is provided with the second epipolar line 42 crossing or touching the end of the centreline of the particular vessel of interest.

Based on the first set of points and the second set of points in the images from two different viewing angles, the closest relevant predetermined features of the vascular structure are determined upon the indication of a location of the points of interest. The determined features of the vascular structure are then used for extracting 2D centrelines, bifurcation points and/or vessel borders of the vascular structure.

Figure 4:
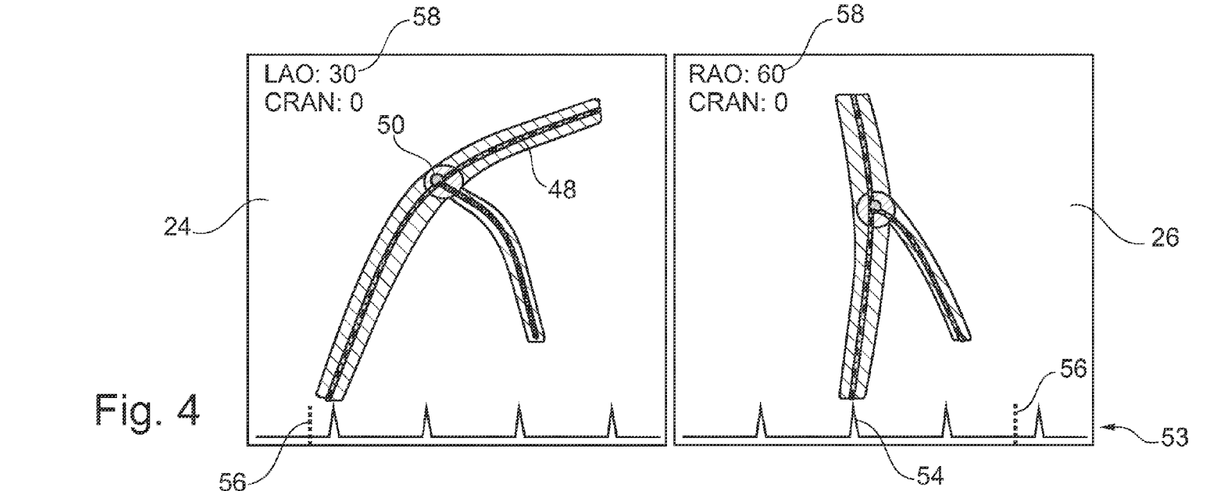
FIG. 4 schematically shows extracted centrelines in combination with a probability map according to the invention.

As an example, in FIG. 4 the extracted 2D centrelines are shown with lines 48 in a certain coded pattern. Also, the bifurcation points are indicated by dots 50 with a coded pattern. For example, the lines 48 can be shown in yellow colour whereas the bifurcation points 50 are shown in blue colour. The vessel borders are not further shown.

FIG. 4 shows the extracted 2D centrelines superimposed over the probability maps 24, 26. According to the invention, the extracted centrelines may also be displayed without the probability map 24 and 26, which is not shown in the figures but which can easily be understood.

Figure 5:
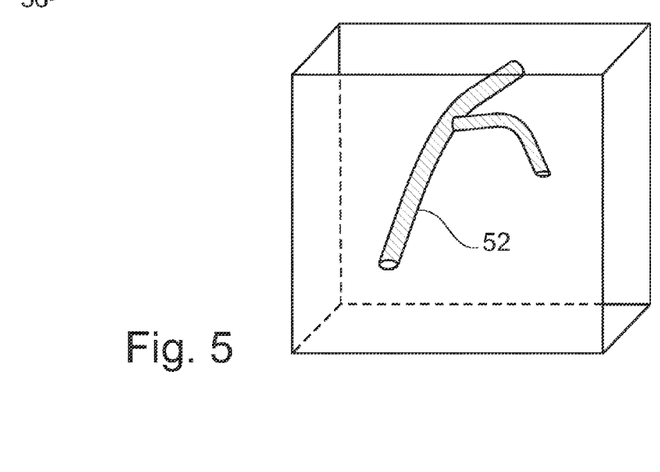
FIG. 5 schematically shows a calculated 3D vessel model.

The extracted 2D centrelines, bifurcation points and/or vessel borders are then used for calculating a 3D vessel model 52 shown in FIG. 5.

In an another exemplary embodiment of the invention, the extracted centrelines displayed as indicated in FIG. 4, can be assessed by the user for dealing with the aspect of accuracy of the centrelines before the calculation of the 3D vessel model 52 in FIG. 5 is performed. For example, in case the user finds that the extracted 2D centrelines are not according to his requirements, the steps as mentioned before, can be repeated.

In a further exemplary embodiment of the invention, the acquired 2D X-ray projection images are displayed in combination with the probability maps shown in FIGS. 2 to 4. For example, the 2D X-ray projection images are angiograms, upon which the probability maps 24, 26 are superimposed, but which is not further shown.

For optimizing the results of the calculation of the 3D model 52, a series of 2D X-ray projection images is acquired for each of the viewing angles. The images are registered to a time rating 53. Then, for quality reasons, images of different viewing angles are chosen corresponding to the same phase to represent the at least two 2D X-ray projection images which are used for the above-mentioned procedure. Thus, images can be chosen according to the level of information contained in the image data.

For example, the choice of the images, or so to speak the selection of the images, can be performed manually by the user or also automatically by the processing unit.

As a time rating signal, in case the object of interest is a patient, physiological parameters are used. For example, respiratory motion is one aspect in X-ray images due to the resulting movement of the thorax, for example.

Another example for a physiological parameter is an ECG signal, for example in case of coronary interventional procedures. For control by the user and for additional information, the ECG signal is displayed in combination with the probability map, which is indicated by a graph 54 in FIGS. 2 to 4, both in the left and right part of the images. The time rating is provided in form of a coded mark 56, for example by a red line.

Also, the viewing angle can be indicated in the image display which is also shown in FIGS. 2 to 4. In the upper left corner of the image halves, the viewing angle is indicated by displaying an angle value 58. As can be seen, the viewing angle differs in 90 degrees.

Figure 6:
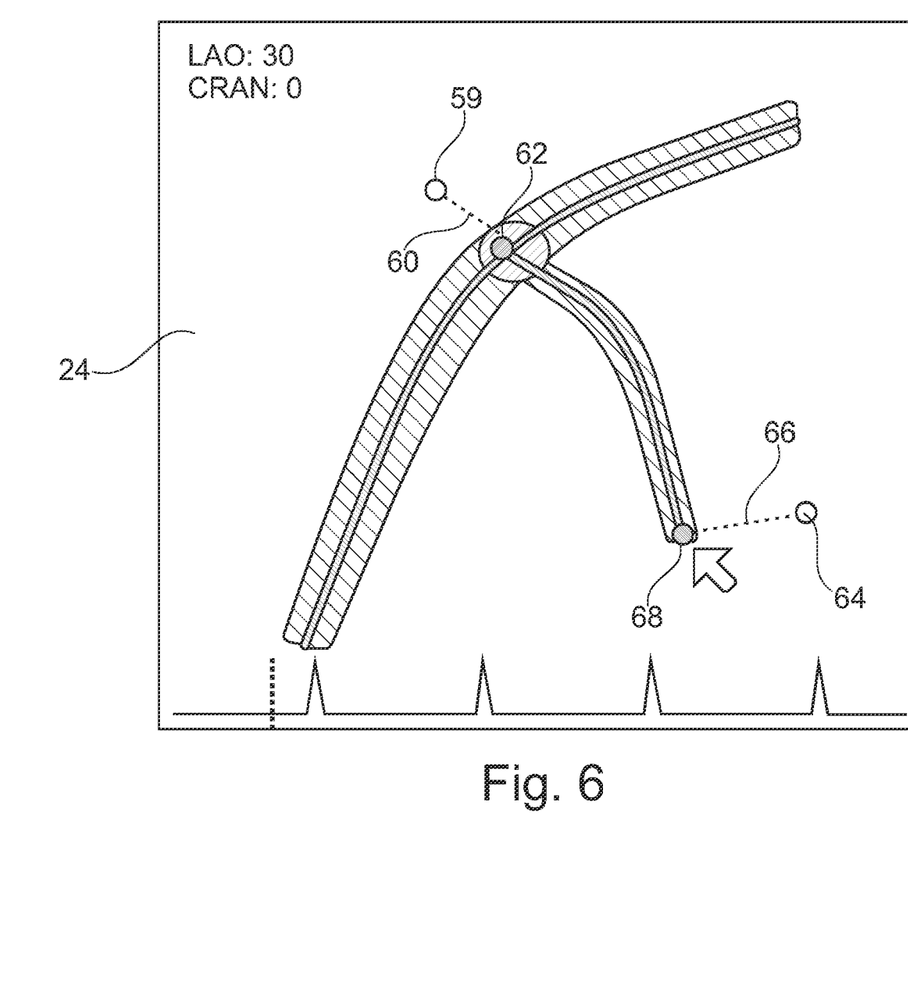
FIG. 6 schematically shows a probability map with indicated points snapped to determined features for interaction purposes.

As an additional feature, a snapping function can be provided by the user which in the following is explained with reference to FIG. 6. For example, upon indicating one of the points of interest, for example for indicating the location of the bifurcation shown in the probability map 24, the position of the closest relevant feature is detected and the indicated points are snapped to the detected position. It must be noted that only the left part of the image described with reference to FIGS. 2 to 4 is shown in FIG. 6, but the snapping function is meant to be provided to the user also for indicating the second set of points in the other probability map 26 shown in the right parts of the FIGS. 2 to 4.

For example, for indicating the bifurcation point, the user clicks near the bifurcation point which is indicated by a dot 59. Upon clicking and setting a point, a position of the closest relevant feature, namely in this case the bifurcation point, is detected and the point 59 is snapped, indicated by a dotted line 60, to the location of the highest probability for the location of a bifurcation point, which is indicated by a dot 62.

As another example, in case the user wants to indicate the location of the end of the vessel, he clicks in the vicinity of the point where he thinks it might be, indicated by a dot 64. Then, upon detecting the position of the closest relevant feature in form of the end of the vessel, the indicated point 64 is snapped to the detected position, indicated in the figure by a dotted line 66. The snapped point is indicated by a dot 68.

The detected position thus represents a guiding option to the user which, according to the invention can be used in three different modes.

For example, in a first mode, the described snapping function is turned off.

In a second mode, the snap-to function is turned on and the user can then confirm the location of the snapped-to points.

In a third mode, the detected positions are only used as a proposal, whereas the user can then either confirm the position or move the cursor device to the originally indicated position or a position in-between.

In a further exemplary embodiment of the invention, the probability map, for example the probability maps 24, 26, is adapted to the position of the cursor device such that the probability map is shown in an enhanced mode in the vicinity of the cursor only and in an reduced level of detailed in other parts.

For example, the probability map is only showing lines indicating a very high probability map for the location of centrelines, bifurcation points and/or vessel borders in order not to show too much information which might be confusing or also disturbing to the user. Then, the user moves the cursor device to, for example, the bifurcation indicated by the lines representing a very high probability, which leads to a change in that area around the cursor point, now showing more detailed information about the probability map giving additional information to the user for this particular area. This inventive feature is not shown in the figures but can easily be understood.

Displaying probability maps for interaction purposes provides the advantage, among others, that the user is provided with enhanced graphical information allowing a quicker and easier or better and more accurate understanding of the vessel tree in the region of interest.

Figure 7:
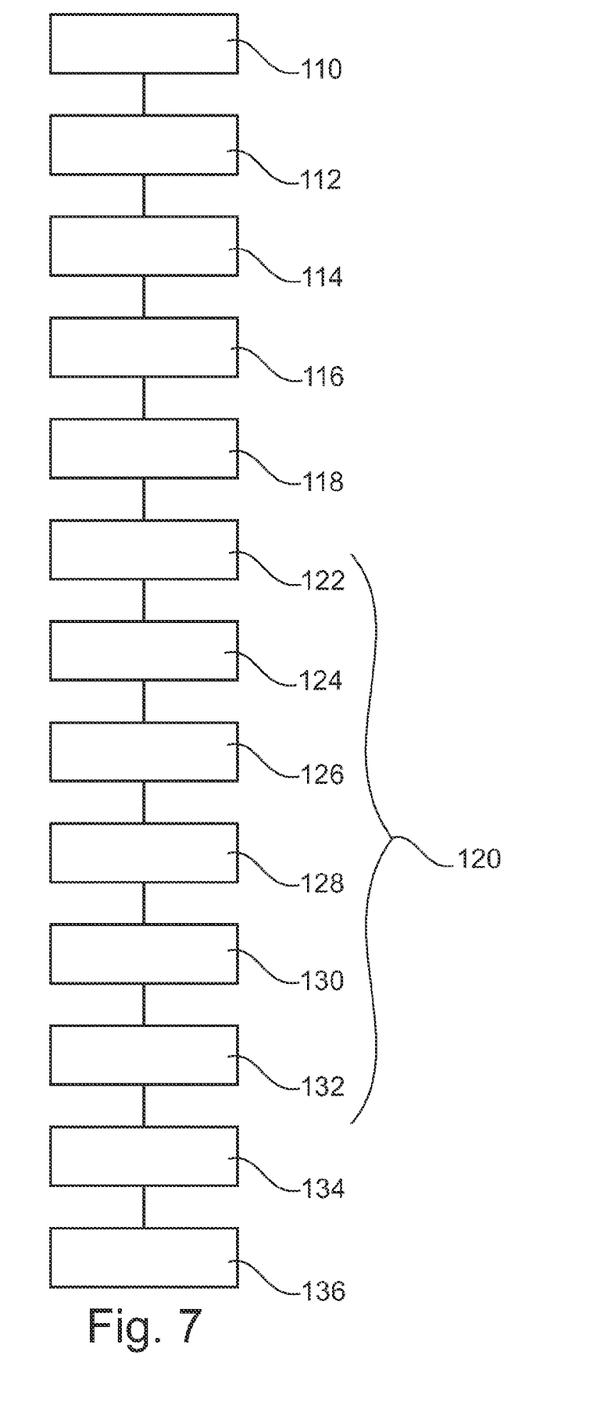
FIG. 7 schematically shows basic method steps according to an exemplary embodiment of the invention.

In FIG. 7, an exemplary embodiment for a method for generating object data of features of a region of interest of an object is shown. Basically, first image data of a region of interest of an object is acquired. Then, probability values for predetermined features in the image data for each picture element are determined. The probability values for each picture element of the image data are then displayed for interaction purposes. Following, features in the displayed probability values are designated by interaction of the user. Next, closest relevant predetermined features are determined on behalf of the designated features. Further, object data is calculated on behalf of the determined features. The calculated object data is then used for further processes.

A further exemplary embodiment is illustrated with reference to FIG. 7 wherein FIG. 7 schematically shows a method for generating a 3D vessel model of a region of interest of an object, which method comprises the following steps: In an acquiring step 110 at least two 2D X-ray projection images 112 of contrast enhanced vascular structures from different viewing angles are acquired. Then, in a determining step 114, a probability map 116 for predetermined vessel features for each of the 2D X-ray projection images 114 is determined. In a displaying step 118, the probability map for each of the 2D X-ray projection images for interaction purposes is displayed. Then, in a segmenting step 120, vessels of interest are segmented by the following sub-steps: First, in an indicating step 122, the location of a first set of points of interest is indicated in the probability map of one of the at least two 2D X-ray projection images by interaction of the user. Then, in a determining step 124, epipolar lines for the first set of points of interest in the probability map of the other one of the at least two 2D X-ray projection images are determined. Further, the determined epipolar lines are then displayed in displaying step 126. Next, in an indicating step 128, a location of a second set of points of interest is indicated in the probability map of the other one of the at least two 2D X-ray projection images by interaction of the user. The epipolar lines act as orientation and a second set of points are corresponding to the indicated first points. In a determining step 130 the closest relevant predetermined features of the vascular structure are determined upon the indication of the location of points of interest. Then, in an extracting step 132, 2D centrelines, bifurcation points and/or vessel borders of the vascular structure are extracted from the determined features of the vascular structure. Finally, a 3D vessel model is calculated from the extracted 2D centrelines, bifurcation points and/or vessel borders in a calculating step 134. In a displaying step 136, the 3D vessel model can be displayed.

Figure 8:
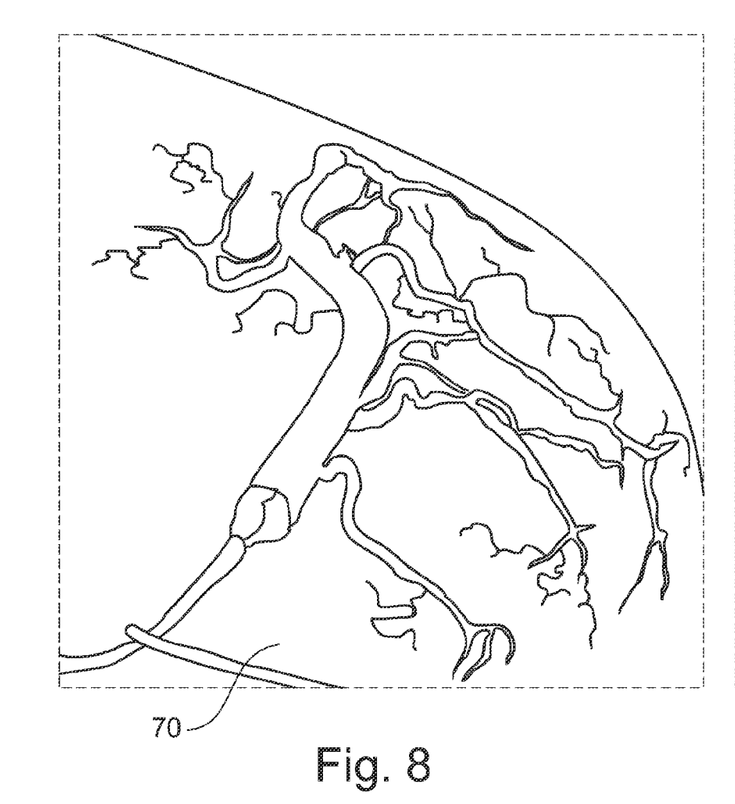
FIG. 8 schematically shows an illustration of an angiogram.

For example, FIG. 8 shows a schematic illustration of an angiogram 70 with vessels represented by the graphical data acquired in the image. A user with rather large experience and good knowledge of the vessel situation in the region of interest can interpret this graphical information to a certain degree of accuracy. But due to the three-dimensional arrangement of the vessels crossing each other in a 2D image, misinterpretation can always occur and the interpretation of the image requires a certain degree of awareness on the side of the user. This can lead to unnecessary time consumption and also adds up to a reduction in concentration.

Figure 9:
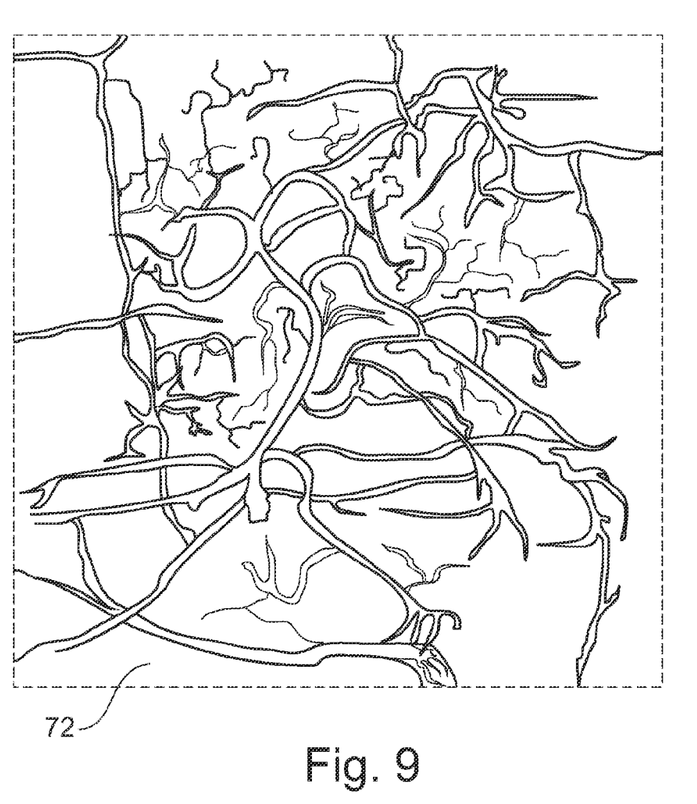
FIG. 9 schematically shows an example for a probability map displayed for interaction purposes.

According to the invention, a probability map 72, as schematically shown in FIG. 9 as an example, is provided to the user displaying the same region of interest. But in contrast to FIG. 8, the image data has already been filtered, and so to speak to a certain degree interpreted, to provide the user with more information than in FIG. 8. As can be seen in FIG. 9, it is much easier for the user to identify both centrelines and bifurcation points. The probability map 72 shown in FIG. 9 thus provides the user with a quicker and easier understanding of the present situation in the region of interest.

Figure 10:
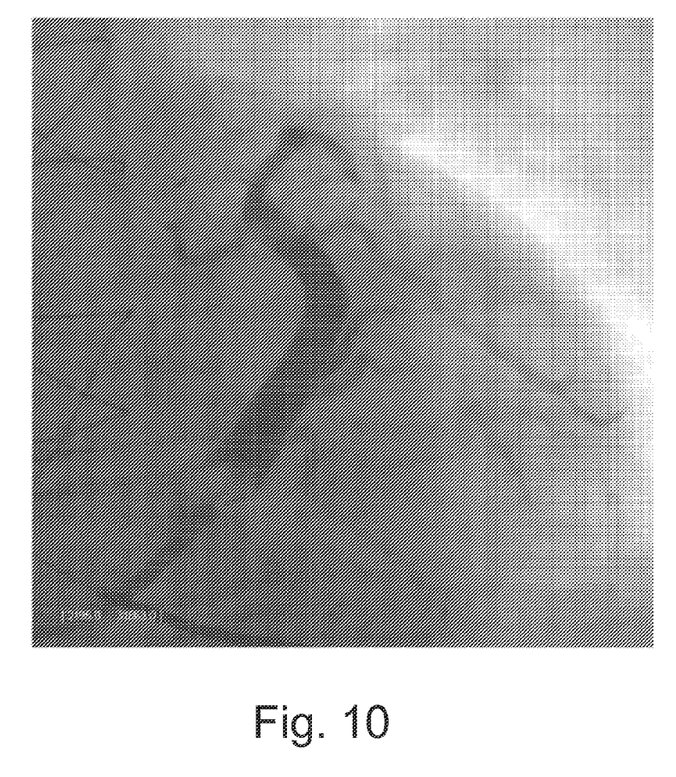
FIG. 10 shows an image of the angiogram of FIG. 8.
Figure 11:
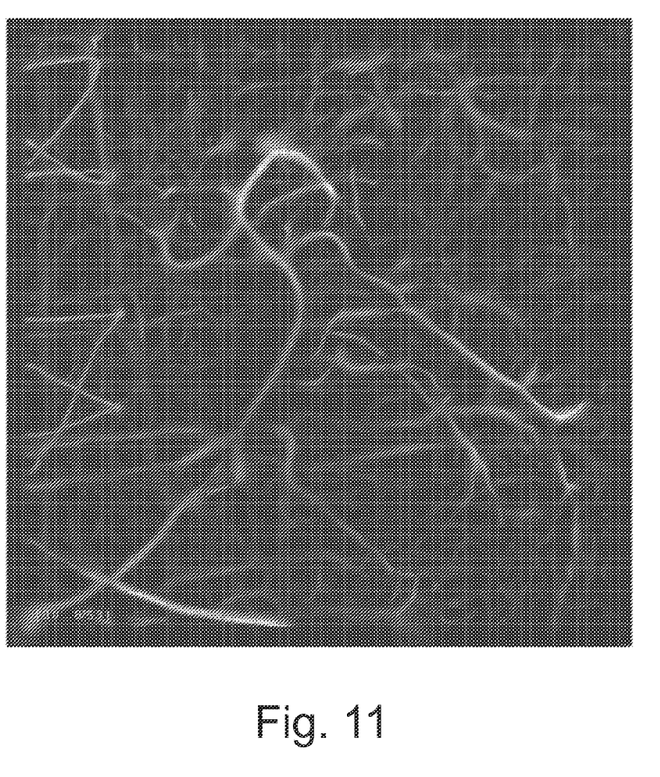
FIG. 11 shows an image of the probability map of FIG. 9.

FIG. 10 shows an image of an angiogram according to FIG. 8 and FIG. 11 shows an image of the probability map of FIG. 9, displayed for interaction purposes.

While the invention has been illustrated and described in details in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage.

A computer program may be stored and/or distributed on a suitable medium, such as an optical storage medium or a solid state medium supplied together with or as part of other hardware, but may also be distributed in other forms, such as via the internet or other wired or wireless telecommunication systems.

Any reference signs in the claims should not be construed as limiting the scope.

The invention claimed is:

1. A medical imaging system for generating object data representative of a feature in a region of interest of an object, said system comprising:
   at least one image data acquisition device;
   a data processing unit;
   a display device; and
   an interface unit;
   said image data acquisition device being configured for acquiring image data of said region of interest, that embody multiple predetermined features, said data comprising picture elements;
   said data processing unit being configured for:
      deriving, for ones of said picture elements, respective probability values;
      displaying, via said display device, for interaction purposes, ones from among said probability values such that a plurality from among said features are in the displayed values:
      designating a feature from among the displayed features;
      deciding, based on the designated feature, what constitutes, from among, said multiple predetermined features, a closest relevant predetermined feature; and
      after said deciding, calculating, to thereby generate, object data on behalf of what was decided to be said closest relevant predetermined feature.

2. The medical imaging system according to claim 1, vessels and vessel features being among said multiple predetermined features, said generated object data being a three-dimensional (3D) vessel model, said acquiring including acquisition of at least two two-dimensional (2D) X-ray projection images of vascular structures from different viewing angles, said deriving comprising determining, for respective ones of said projection images, probability maps of said probability values for associated ones of the predetermined vessel features,
   said data processing unit being further configured for:
      determining, for a first set of multiple points of interest within one of said maps, epipolar lines in another of said maps said deciding being based upon said first set and a corresponding, second set multiple points of interest within another of said maps;
      extracting coordinates for the decidedly closest relevant predetermined feature; and
      using the extracted coordinates in the generating of said 3D vessel model,
   said displaying comprising displaying said maps, said data processing unit being further configured fir displaying, for interaction purposes, said epipolar lines, said epipolar lines acting as orientation,
   said data processing unit being further configured for indications respectively corresponding to the points of said first set and the points of said second set.

3. The medical imaging system according to claim 1, said data processing unit being configured for, based on a decision made in said deciding, detecting a position of said closest relevant predetermined feature, said designating comprising indicating a point of interest in a probability map comprising ones of said values, said data processing unit being further configured for snapping the indicated point to the detected position.

4. A method for generating object data of features of a region of interest of an object, comprising the following steps: a) acquiring, via an imaging device under control of a data processor, image data of a region of interest of an object; b) determining probability values for predetermined features in the image data for each picture element of the image data; c) displaying the probability values for interaction purposes; d) designating features in the displayed probability values by interaction of a user; e) determining, by said processor, closest relevant predetermined features on behalf of the designated features; f) calculating, and thereby generating, object data on behalf of the determined features; g) using the calculated object data for further processes.

5. The method according to claim 4, further comprising the steps of:
extracting coordinates for the determined closest relevant predetermined features, said extracted coordinates pertaining to blood vessel centerlines, blood vessel bifurcation points and/or blood vessel borders; and
displaying said determined closest relevant predetermined features for an assessment of accuracy by the user before said calculating is performed.

6. The method according to claim 4, said designating comprising indicating a point of interest, at a location disposed among the displayed probability values, by interactive user indication of an image, within the acquired image data, that was acquired from a particular viewing angle that differs from a viewing angle at which another portion of said image data was acquired.

7. The method according to claim 4, said displaying comprising displaying, in combination with at least two two-dimensional (2D) X-ray projection images acquired in said acquiring, a map of said probability values.

8. The method according to claim 7, said probability map being superimposed over said at least two 2D X-ray projection images. thereby generating an augmented angiogram.

9. The method according to claim 4, said acquiring comprising:
acquiring a series of 2D X-ray projection images for each of multiple viewing angles:
registering said projection images to a time rating; and
choosing, as said image data, from among the multiple images ones that correspond to a same phase.

10. The method according to claim 4, said designation comprising indicating a point of interest, at a location disposed among the displayed probability values, a position of said closest relevant predetermined feature being, upon said indicating, detected and the indicated point being snapped to the detected position.

11. The method according to claim 4, said determining comprising determining a probability map of said values, said map being based on previous interaction by the user.

12. The method according to claim 4, said displaying comprising dynamically adapting a probability map of said probability values to a position of a cursor device such that said probability map is shown in an enhanced mode in a vicinity of said cursor and in a reduced level of detail in the other parts.

13. A non-transitory computer readable medium embodying a program for generating object data of features of a region of interest of an object, said program comprising instructions executable by a processor for performing a plurality of acts, among said plurality there being the acts of:
a) acquiring, via an imaging device under control of said processor, image data of a region of interest of an object;
b) determining probability values for predetermined features in the image data for each picture element of the image data;
c) displaying the probability values for interaction purposes;
d) designating features in the displayed probability values by interaction of a user;
e) deciding what constitute closest relevant predetermined features on behalf of the designated features; and
f) calculating, and thereby generating, object data on behalf of the determined features.

14. The system of claim 1, said designating being performed via said interface unit by interaction of a user.

15. The system of claim 14, said image data being acquired from different viewing angles with respect to said region of interest, said displaying being divided among said different viewing angles to form respective views.

16. The system of claim 15, further configured for displaying an epipolar line aligned with a location, in one of said views, of the designated feature and with a corresponding location, in another of said views, of said designated feature.

17. The system of claim 15, further configured for specifically establishing each of a first set of multiple points in one of the views, and each of a corresponding, second set of multiple points in another of said views, said deciding being based on both sets of points, said establishing comprising said designating.

18. The system of claim 1, said designating being performed by said data processing unit rather than manually by a user.

19. The system of claim 1, said ones of said features being in the displayed values in that said ones are spatially surrounded by said values.

20. The system of claim 1, said deciding from among said multiple predetermined features deciding from among said displayed features.

21. The system of claim 1, said data processing unit being further configured for, displaying the calculated object data.

* * * * *